United States Patent [19]

Didlake

[11] Patent Number: 5,544,799
[45] Date of Patent: Aug. 13, 1996

[54] SWING AWAY CARGO CARRIER ASSEMBLY

[76] Inventor: Ralph L. Didlake, 9215 W. Douglas, Wichita, Kans. 67209-1453

[21] Appl. No.: 490,206

[22] Filed: Jun. 14, 1995

[51] Int. Cl.⁶ ........................................... B60R 9/06
[52] U.S. Cl. .................... 224/502; 224/282; 224/519; 224/523
[58] Field of Search ..................... 224/282, 280, 224/488, 495, 502, 505, 506, 507, 508, 518, 519, 521, 522, 523, 524, 924; 414/462

[56] References Cited

U.S. PATENT DOCUMENTS

| 2,133,427 | 10/1938 | Condon . | |
| 3,158,302 | 11/1964 | Dickerson | 224/495 |
| 3,202,332 | 8/1965 | Walker . | |
| 3,458,073 | 7/1969 | Dawson | 214/450 |
| 3,731,830 | 5/1973 | Long | 214/450 |
| 4,221,311 | 9/1980 | Penn . | |
| 4,976,386 | 12/1990 | Geiger | 224/495 |
| 5,029,740 | 7/1991 | Cox . | |
| 5,038,983 | 8/1991 | Tomososki . | |
| 5,094,373 | 3/1992 | Lovci . | |
| 5,106,002 | 4/1992 | Smith et al. | 224/508 |
| 5,137,192 | 8/1992 | Sheridan et al. | 224/924 |
| 5,190,195 | 3/1993 | Fullhart et al. | 224/506 |
| 5,205,700 | 4/1993 | Lin et al. | 414/540 |
| 5,232,135 | 8/1993 | Marren . | |
| 5,330,084 | 7/1994 | Peters | 224/506 |
| 5,439,151 | 8/1995 | Clayton | 224/282 |
| 5,454,496 | 10/1995 | Sumida et al. | 224/521 |

Primary Examiner—Henry J. Recla
Assistant Examiner—Gregory M. Vidovich
Attorney, Agent, or Firm—John R. Flanagan

[57] ABSTRACT

A swing away cargo carrier assembly for use with a vehicle having a receiver-type hitch includes a main support tube adapted for insertion into the receiver hitch and extending rearwardly therefrom, a main extension arm attached to the main support tube and extending laterally along the rear of the vehicle, a pivot support member attached to and extending rearwardly from the main extension arm, a swing arm attached to the pivot support member and means, such as a frame, attached to the swing arm for supporting a cargo container. A releasable device, such as a stop and lock member, for retaining the swing arm in a retracted position are also included in the invention. The swing arm is adapted for undergoing pivotal movement between a retracted position in which the swing arm is disposed adjacent to the main extension arm and the rear of the vehicle and an extended position in which the swing arm is disposed away from the main extension arm and the rear of the vehicle so that the assembly and container which it supports do not interfere with the opening of the tailgate or rear doors of the vehicle nor inhibit access to the rear of the vehicle.

17 Claims, 2 Drawing Sheets

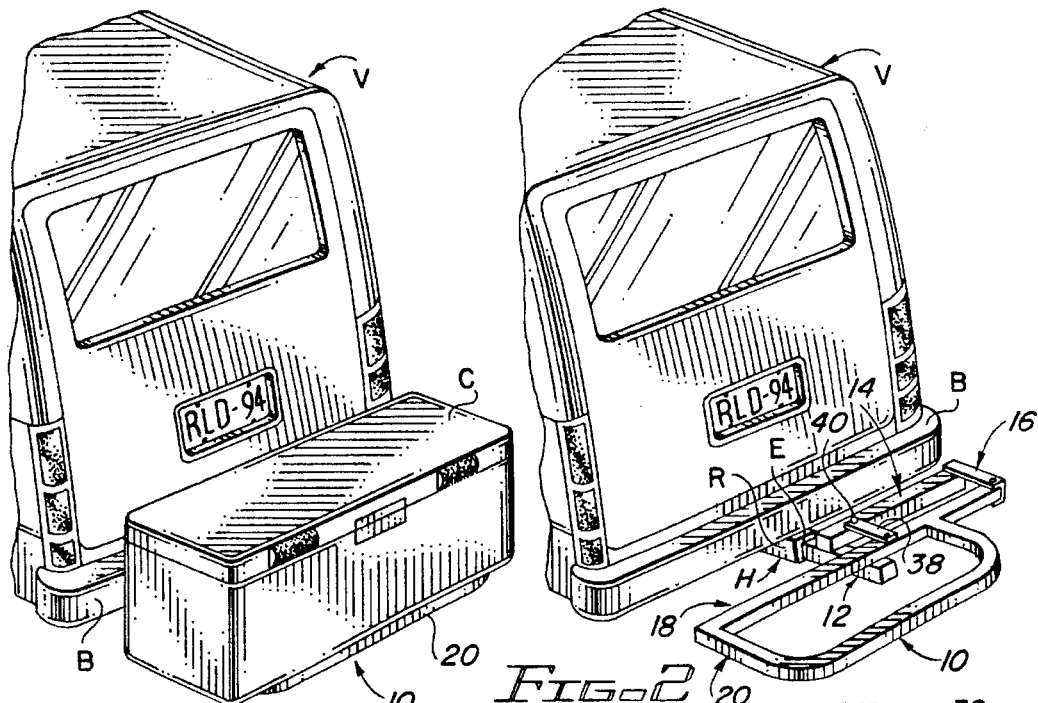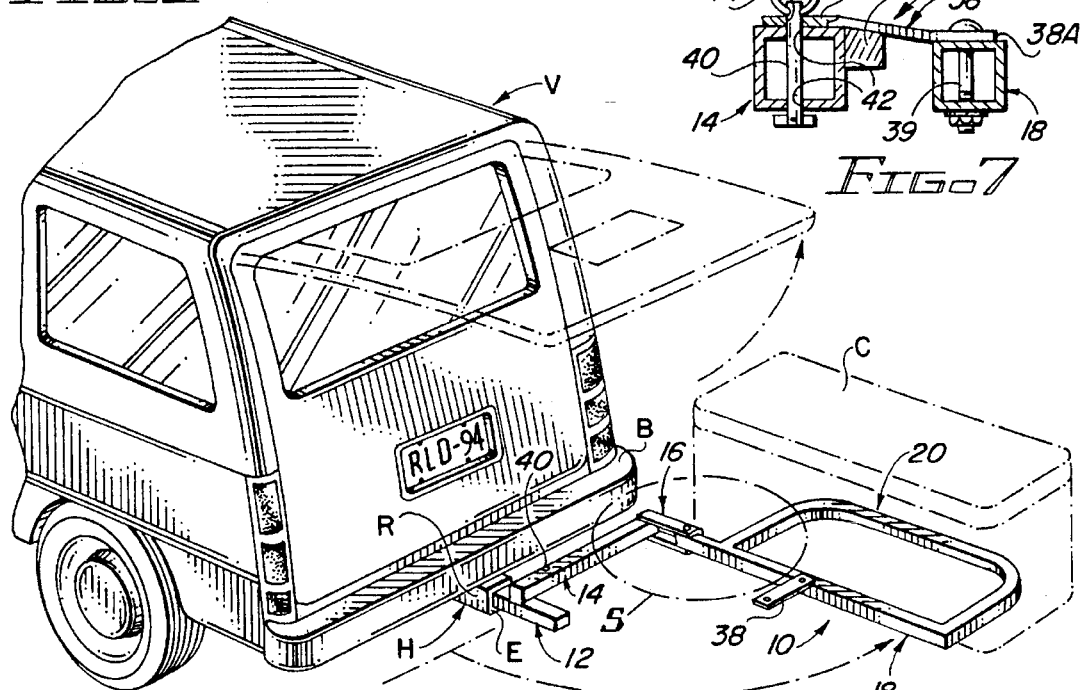

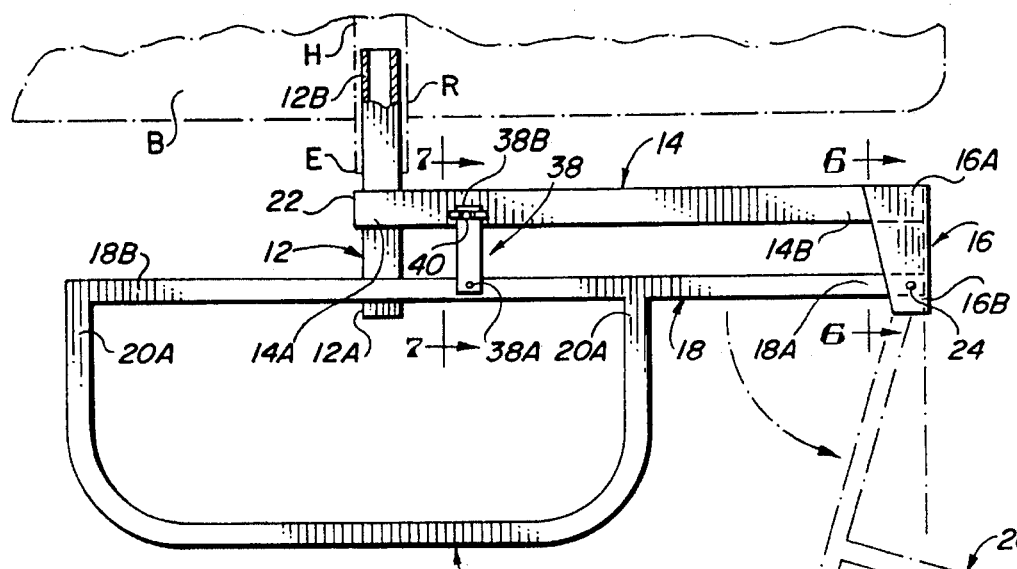
FIG. 4
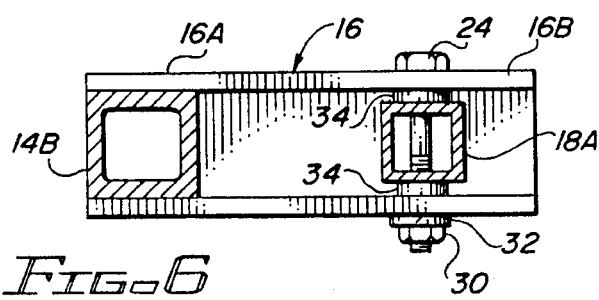
FIG. 6
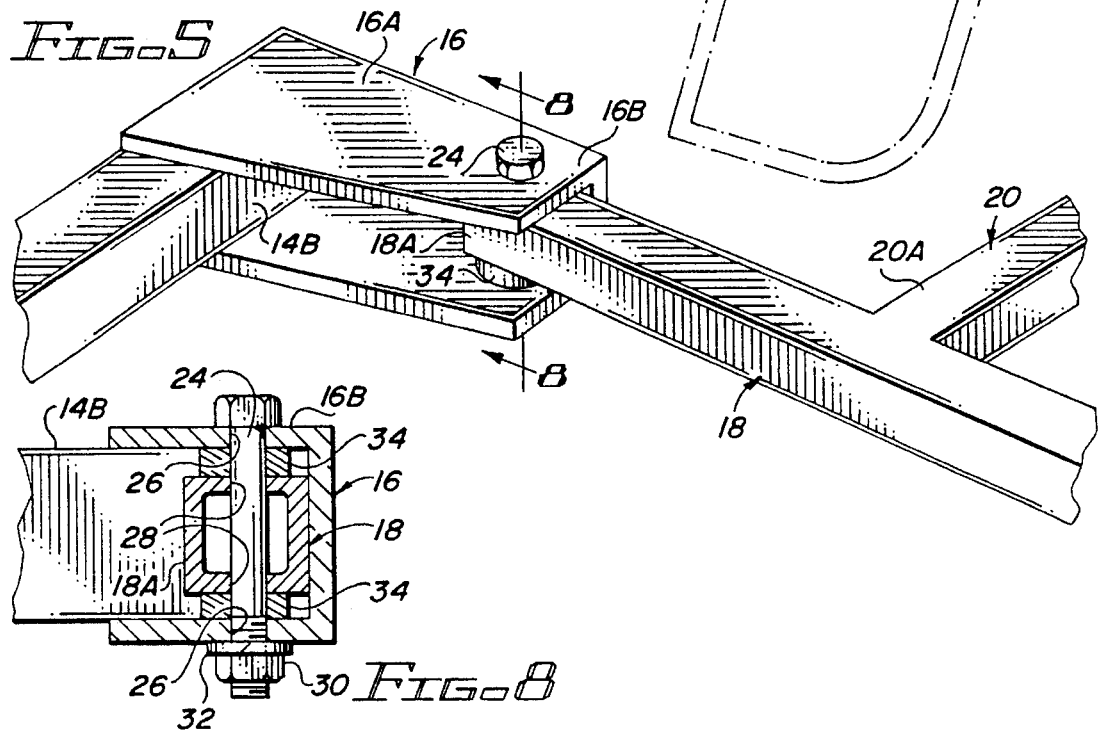
FIG. 5
FIG. 8

SWING AWAY CARGO CARRIER ASSEMBLY

BACKGROUND OF THE INVENTION

1. Field of the Invention

The present invention generally relates to a carrier assembly for supporting a cargo container at the rear of a vehicle and, more particularly, is concerned with a carrier assembly which attaches to a receiver-type trailer hitch and is adapted for swinging of the cargo container which it supports outward and away from the rear of the vehicle.

2. Description of the Prior Art

It is often desirable to increase the capacity of a vehicle to transport cargo, such as luggage, by supporting a container for carrying additional cargo on the outside of the vehicle. Various carrier designs exist that may support cargo containers at various locations on a vehicle. Some carriers attach to the roof of a vehicle. Such roof-top carriers make it difficult to load and unload the container since the cargo must be lifted to the roof of the vehicle. Roof-top carriers are especially disadvantageous when the vehicle is a van or mini-van because such vehicles have highly elevated roofs.

Carriers designed to attach to the rear of a vehicle have a significant advantage over roof-top carriers because it is easier to load and unload a cargo container supported at the rear of the vehicle. Some carriers attach to the rear bumper of the vehicle, however such designs can be very difficult if not impossible to attach to the bumpers of many recent automobiles. Additionally, the bumpers of many recent automobiles lack adequate strength to support a significant load on the carrier. To overcome these two limitations, other carriers attach to receiver-type hitches available at the rear of many vehicles. Such carriers are easy to attach and can support substantial loads since they fit into a hitch designed specifically for quick attachment of trailers and the like.

When a carrier is attached to a receiver hitch at the rear of a vehicle, it can inhibit access to the rear of a vehicle and can interfere with the opening of the trunk, tailgate or doors at the rear of the vehicle necessitating its removal from the vehicle whenever the trunk, tailgate or rear doors must be opened. This presents a significant disadvantage. Several carrier assemblies exist that overcome this disadvantage by allowing the container to pivot or otherwise be moved out of the way so that the container does not interfere with the opening of a trunk, tailgate or rear doors of the vehicle without the need to remove the carrier from the vehicle.

The luggage carrier disclosed in U.S. Pat. No. 3,202,332 to Walker pivots about one of its supporting members so that it may be swung outward away from the rear of the vehicle to provide greater access to the trunk of the vehicle. However, it is not adapted for attachment to a receiver-type hitch and is therefore rather difficult to install. The trunk top carrier disclosed in U.S. Pat. No. 5,232,135 to Marren is adapted for attachment to a receiver-type hitch but, because it includes a stationary vertical bracket, it is inappropriate for use on vehicles which have a tailgate that swings upward, such as many mini-vans and sport-utility vehicles, or a tailgate which swings downward, such as many trucks. The luggage rack for vehicles disclosed in U.S. Pat. No. 5,029,740 to Cox pivots from a raised position to a ground position so that it does not interfere with the opening of an upward or downward swinging tailgate. Nevertheless, the assembly remains positioned immediately behind the vehicle and thus continues to hinder access to the rear of the vehicle unless the assembly is removed from the receiver hitch and moved. The sports equipment vehicle rack disclosed in U.S. Pat. No. 5,094,373 to Lovci is adapted for attachment to a receiver-type hitch and pivots from adjacent to the rear of the vehicle to remote therefrom, but employs a vertical equipment rack thereon.

Consequently a need still exists for a carrier assembly for supporting a cargo container at the rear of a vehicle that attaches to a receiver hitch at the rear of the vehicle and allows for swinging of the cargo container outward from the rear of the vehicle so that the assembly does not interfere with the opening of a tailgate or doors at the rear of the vehicle and does not hinder access to the rear of the vehicle.

SUMMARY OF THE INVENTION

The present invention provides a swing away cargo carrier assembly for use with a vehicle having a receiver-type hitch disposed at the rear of the vehicle which carrier assembly is designed to satisfy the aforementioned needs by avoiding the drawbacks of the prior art without introducing other drawbacks. The swing away cargo carrier assembly of the present invention basically includes a main support member adapted for insertion into the receiver hitch and extending rearwardly therefrom, a main extension arm attached at an inner end to the main support member and extending laterally along the rear of the vehicle, a pivot support member attached to and extending rearwardly from an outer end of the main extension arm, a swing arm attached to the pivot support member and a support member attached to and extending rearwardly from the swing arm for supporting a cargo container. The carrier assembly also includes releasable means in the form of a stop and lock member and a removable pin, for releasably interconnecting the swing arm to the main extension arm, for releasably retaining the swing arm in a retracted position adjacent to the main extension arm.

One feature of the carrier assembly of the present invention is that it supports a cargo container at the rear of a vehicle having a receiver hitch. The assembly is easily attached by inserting the main support member into the receiver hitch. The support member attached to the swing arm supports a cargo container at the rear of the vehicle where it is easier to load and unload luggage or other cargo from the container. The carrier assembly can also support a substantial load since it is adapted to attach to a receiver hitch instead of to a bumper.

Another feature of the present invention is that the swing arm is disposed rearwardly of and horizontally aligned with the main extension arm and is adapted for undergoing pivotal movement between a retracted position in which the swing arm is disposed adjacent to the main extension arm and the rear of the vehicle and an extended position in which the swing arm is disposed away from the main extension arm and the rear of the vehicle. This feature allows the cargo container which is supported by the support member attached to the swing arm to be pivoted outward away from the rear of the vehicle. Thus the carrier assembly and the cargo container that it supports do not interfere with the opening of the tailgate or rear doors of the vehicle nor inhibit access to the rear of the vehicle.

These and other features and advantages of the present invention will become apparent to those skilled in the art upon a reading of the following detailed description when taken in conjunction with the drawings wherein there is shown and-described an illustrative embodiment of the invention.

BRIEF DESCRIPTION OF THE DRAWINGS

In the following detailed description, reference will be made to the attached drawings in which:

FIG. 1 is a perspective view showing a cargo container supported on a swing away cargo carrier assembly of the present invention at the rear of a vehicle.

FIG. 2 is a perspective view showing the swing away cargo carrier assembly attached to a receiver hitch at the rear of a vehicle.

FIG. 3 is a perspective view showing how the swing away cargo carrier assembly swings outward from a retracted position to an extended position to allow for the opening of a tailgate at the rear of the vehicle.

FIG. 4 is an enlarged top view showing the swing away cargo carrier assembly of FIG. 2.

FIG. 5 is an enlarged detailed perspective view of the components of the swing away cargo carrier assembly enclosed in the circle 5 of FIG. 3.

FIG. 6 is an enlarged cross-sectional view taken along line 6—6 in FIG. 4.

FIG. 7 is an enlarged cross-sectional view taken along line 7—7 in FIG. 4.

FIG. 8 is a cross-sectional view taken along line 8—8 in FIG. 5.

DETAILED DESCRIPTION OF THE INVENTION

Referring to the drawings and particularly to FIGS. 1–4, there is illustrated a swing away cargo carrier assembly of the present invention, generally designated 10. The carrier assembly 10 underlies and supports a conventional cargo container C. In turn, the carrier assembly 10 is supported by a tubular receiver R of a hitch H mounted to underside of and extending rearwardly from the rear of a vehicle V.

Referring to FIGS. 2–4, the carrier assembly 10 basically includes a main support member 12, an elongated main extension arm 14, a pivot support member 16, an elongated swing arm 18, and a support member 20. The main support member 12 of the carrier assembly 10 has a front end 12B adapted for installation by telescopic insertion into a rear end E of the tubular receiver R of the hitch H. Suitable means, such as a releasable lock pin (not shown), is provided for insertion through the main support member 12 and hitch receiver R for retaining the main support member 12 telescopically installed in the hitch receiver R. The main support member 12 also extends rearwardly from the hitch receiver R to a rear end 12A which is spaced rearwardly from the receiver R.

The main extension arm 14 of the carrier assembly 10 at an inner end 14A overlies and is fixedly attached to the main support member 12 at a location thereon between and spaced from the front and rear ends 12A, 12B of the main support member 12 and adjacent to a rear end E of the receiver R of the hitch H. Also, a backing plate 22 (seen only in FIG. 4) can be positioned vertically along and fixedly attached to a side portion of the main support member 12 and end face of the main extension arm 14 to reinforce and strengthen the attachment of the inner end 14A of the main extension arm 14 to the main support member 12. The main extension arm 14, which is of substantially greater length than the main support member 12, extends laterally in a cantilevered fashion from the main support member 12 along the rear bumper B of the vehicle V to an outer end 14B of the main extension arm 14 located approximately at the right rear corner of the vehicle V.

The swing arm 18 of the carrier assembly 10 is pivotally interconnected to the outer end 14B of the main extension arm 14 by the pivot support member 16 of the carrier assembly 10. The pivot support member 16 is preferably fixedly attached at a forward end 16A to the outer end 14B of the main extension arm 14 and extends rearwardly therefrom in a generally perpendicular relationship. The swing arm 18 of the carrier assembly 10 is mounted at an outer end 18A to a rearward end 16B of the pivot support member 16 for undergoing pivotal movement relative thereto and to the main extension arm 14 between a retracted position, as seen in solid line form in FIGS. 2 and 4, and an extended position, as seen in solid line form in FIG. 3 and in dashed line form in FIG. 4. In the retracted position, the swing arm 18 is spaced rearwardly of the main extension arm 14 and rear bumper B of the vehicle V and is disposed adjacent to and extends generally parallel to the main extension arm 14. Further, at the retracted position, the swing arm 18, which is substantially greater in length than the main extension arm 14, overlies and extends laterally beyond the rear end 12A of the main support member 12 to an inner end 18B located between the left rear corner of the vehicle V and the centrally-located main support member 12. In the extended position, the swing arm 18 is disposed in an angular relationship to and extends away from the main extension arm 14 and the rear bumper B of the vehicle V.

The main support member 12, the main extension arm 14, and the swing arm 18 are preferably constructed from tubing having a square cross-section and preferably made of a suitable metal, such as aluminum or steel. The pivot support member 16 is preferably constructed from a suitable channel of metal material having a C-shaped cross-section.

Referring to FIGS. 5 and 6, the pivot support member 16 has an inner width greater than the outer widths of the extension arm 14 and the swing arm 18 so that the outer ends 14B and 18A of the main extension arm 14 and the swing arm 18 fit within the channel of the pivot support member 16. The pivot support member 16 is suitably fixedly attached, such as by being welded, to the outer end 14B of the main extension arm 14, whereas so that it may undergo pivotal movement between the retracted and extended positions, the outer end 18A of the swing arm 18 is attached to the pivot support member 16 by any suitable means, such as a bolt 24 which extends through holes 26, 28 in the pivot support member 16 and the outer end 18A of the swing arm 18 and is secured by a nut 30 and a washer 32, as is shown in FIG. 8. Also, bushings 34 are disposed about the bolt 24 and extend between the adjacent surfaces of the pivot support member 16 and the swing arm 18.

Referring to FIGS. 2–4, the support member 20 of the carrier assembly 10 is rigidly attached to and extends rearwardly from a rear side of the swing arm 18 for supporting the cargo container C thereon. The cargo container C is suitably attached on the swing arm 18 and support member 20. More particularly, the support member 20 is rigidly attached at a pair of opposite forward ends 20A to spaced portions of the swing arm 18 and extends rearwardly in a cantilevered manner therefrom. The support member 20 preferably has a generally U-shaped cbnfiguration although other configurations are possible. Furthermore, the support member 20 and swing arm 18 lie and pivot in a common horizontal plane.

Referring now to FIG. 7, the carrier assembly 10 also includes means 36 for holding the swing arm 18 in the retracted position adjacent to the rear of the vehicle V while the vehicle V is being driven. The holding means 36 is releasable to allow the swing arm 18 to pivot to the extended position, when desired. The holding means 36 includes a stop and lock member 38 mounted at one end 38A by a fastener 39 on the swing arm 18 at a location intermediately between the outer and inner ends 18A, 18B thereof. The stop and lock member 38 extends therefrom toward the main extension arm 14. The holding means 36 also includes a pin 40 removably insertable through aligned apertures 42 defined in the main extension member 14 and a hole 44 defined in the unattached free end 38B of the stop and lock member 38 when the swing arm 18 is in the retracted position wherein the hole 44 is aligned over the apertures 42 in the main extension member 14. The stop and lock member 38 is an elongated rigid strap having the hole formed in the forward portion or free end thereof. An alignment element 46 is fixed to the bottom side of the stop and lock member 38 so that the apertures 42 and hole 44 will be aligned when the element 46 abuts the main extension member 14. The removable pin 40 is then inserted through the aligned apertures 42 and hole 44 to retain the swing arm 18 in the retracted position. Removal of the pin 40 will allow the swing arm 18 to be pivoted away from the main extension member 14 to the extended position.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A swing away cargo carrier assembly for use with a vehicle having a receiver-type hitch disposed at the rear of the vehicle, said carrier assembly comprising:
   (a) a main support member including a front end adapted for insertion into the receiver hitch and extending rearwardly from the receiver hitch to a rear end spaced from the receiver hitch;
   (b) a main extension arm fixedly attached at an inner end thereof to said main support member at a location between and spaced from said front and rear ends of said main support member and adjacent to a rear end of the receiver hitch, said main extension arm extending laterally from said main support member along the rear of the vehicle to an outer end;
   (c) a pivot support member fixedly attached to said outer end of said main extension arm and extending rearwardly therefrom;
   (d) a swing arm mounted at an outer end to said pivot support member for undergoing pivotal movement relative thereto and to said main extension arm between a retracted position in which said swing arm is disposed adjacent to and rearwardly of said main extension arm and adjacent to the rear of the vehicle with an inner end of said swing arm overlapping and extending laterally beyond said rear end of said main support member and an extended position in which said swing arm is disposed away from said main extension arm and the rear of the vehicle; and
   (e) means attached to and extending rearwardly from said swing arm for supporting a cargo container.

2. The assembly of claim 1 wherein said main support member, said main extension arm, and said swing arm are constructed from tubing having a square cross-section.

3. The assembly of claim 1 wherein said pivot support member is constructed from a channel having a C-shaped cross-section.

4. The assembly of claim 1 wherein said supporting means is a generally U-shaped support member attached at opposite forward ends to said swing arm and extending rearwardly in a cantilevered manner from said swing arm.

5. The assembly of claim 4 wherein said U-shaped support member and said swing arm lie in a common plane.

6. The assembly of claim 1 further comprising:
   means for holding said swing arm in said retracted position, said holding means being releasable to allow said swing arm to pivot to said extended position.

7. The assembly of claim 6 wherein said holding means includes a stop and lock member mounted on said swing arm intermediately between said inner and outer ends of said swing arm and extending therefrom toward said main extension arm.

8. The assembly of claim 7 wherein said holding means further includes a pin removably insertable through an aperture defined in said main extension member and a hole defined in said stop and lock member when said swing arm is in said retracted position with said hole aligned over said aperture in said main extension member.

9. The assembly of claim 7 wherein said stop and lock member is an elongated rigid strap having said hole formed in a forward portion thereof.

10. A swing away cargo carrier assembly for use with a vehicle having a receiver-type hitch disposed at the rear of the vehicle, said carrier assembly comprising:
    (a) a main support member including a front end adapted for insertion into the receiver hitch and extending rearwardly from the receiver hitch to a rear end spaced from the receiver hitch;
    (b) a main extension arm fixedly attached at an inner end thereof to said main support member at a location between and spaced from said front and rear ends of said main support member and adjacent to a rear end of the receiver hitch, said main extension arm extending laterally from said main support member along the rear of the vehicle to an outer end;
    (c) a pivot support member fixedly attached to said outer end of said main extension arm and extending rearwardly therefrom;
    (d) a swing arm mounted at an outer end to said pivot support member for undergoing pivotal movement relative thereto and to said main extension arm between a retracted position in which said swing arm is disposed adjacent to and rearwardly of said main extension arm and adjacent to the rear of the vehicle with an inner end of said swing arm overlapping and extending laterally beyond said rear end of said main support member and an extended position in which said swing arm is disposed away from said main extension arm and the rear of the vehicle;
    (e) means for holding said swing arm in said retracted position, said holding means being releasable to free and allow said swing arm to pivot to said extended position; and
    (f) a generally U-shaped support member having a pair of opposite ends attached to said swing arm such that said U-shaped support member extends reawardly from and in a common plane with said swing arm for supporting a cargo container.

11. The assembly of claim 10 wherein said main support member, said main extension arm, and said swing arm are constructed from tubing having a square cross-section.

12. The assembly of claim 10 wherein said pivot support member is constructed from a channel having a C-shaped cross-section.

13. The assembly of claim 10 wherein said U-shaped support member extends rearwardly from said swing arm in a cantilevered manner.

14. The assembly of claim 13 wherein said U-shaped support member and said swing arm lie in a common plane.

15. The assembly of claim 10 wherein said holding means includes a stop and lock member mounted on said swing arm intermediately between said inner and outer ends of said swing arm and extending therefrom toward said main extension arm.

16. The assembly of claim 15 wherein said holding means further includes a pin removably insertable through an aperture defined in said main extension member and a hole defined in said stop and lock member when said swing arm is in said retracted position with said hole aligned over said aperture in said main extension member.

17. The assembly of claim 16 wherein said stop and lock member is an elongated rigid strap having said hole formed in a forward portion thereof.

* * * * *